C. E. AND E. E. BJORGE.
COCKROACH TRAP.
APPLICATION FILED MAR. 6, 1919.
1,314,242.
Patented Aug. 26, 1919.
2 SHEETS—SHEET 1.
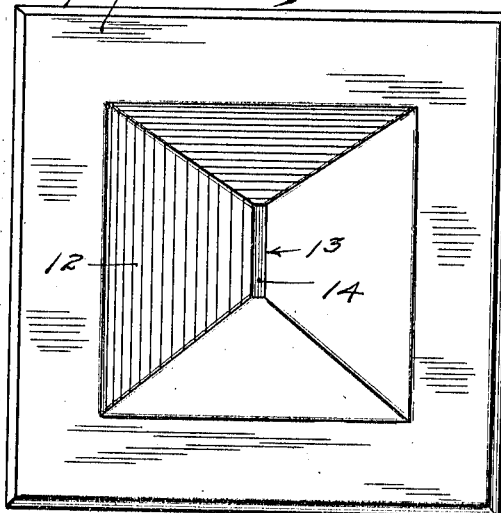
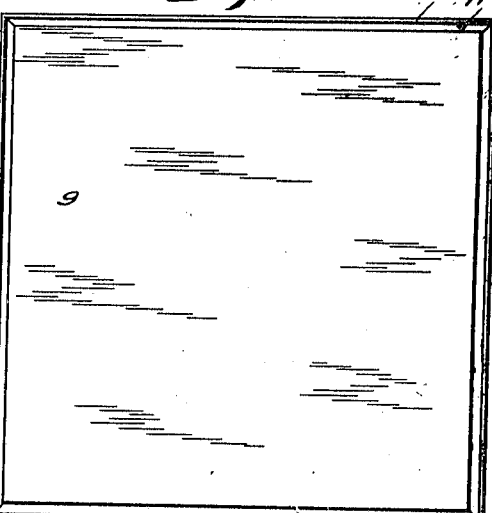
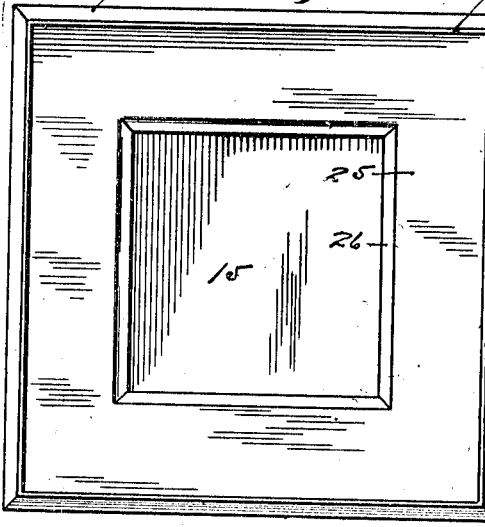
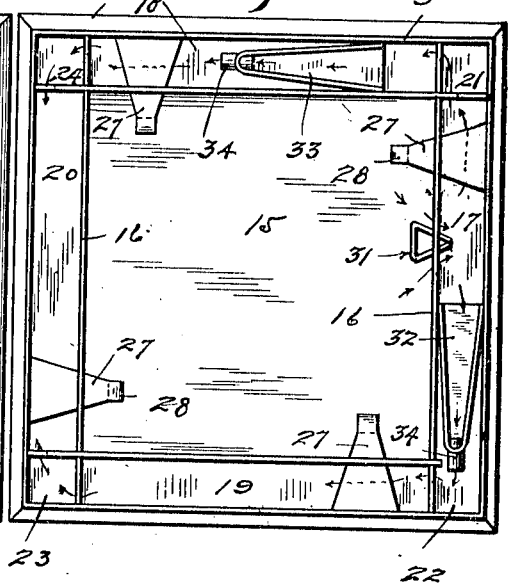
Inventors
Christen E. Bjorge
Edward E. Bjorge
By their Attorneys
Williamson

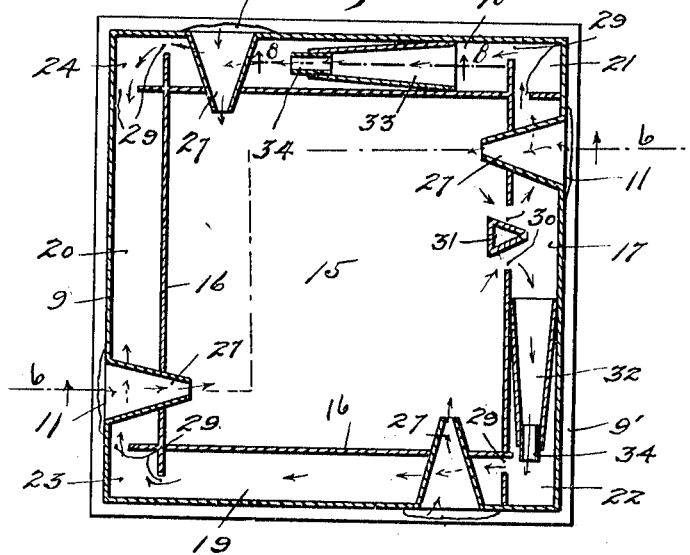
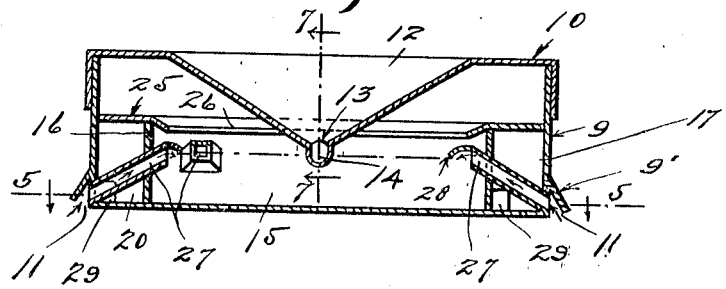
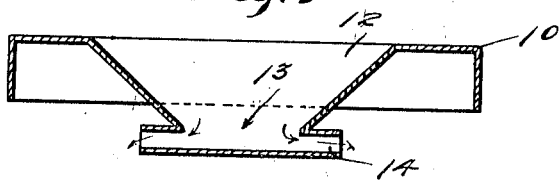
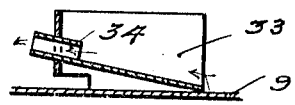

UNITED STATES PATENT OFFICE.

CHRISTEN E. BJORGE AND EDWARD E. BJORGE, OF DETROIT, MINNESOTA.

COCKROACH-TRAP.

1,314,242. Specification of Letters Patent. Patented Aug. 26, 1919.

Application filed March 6, 1919. Serial No. 281,041.

*To all whom it may concern:*

Be it known that we, CHRISTEN E. BJORGE and EDWARD E. BJORGE, citizens of the United States, residing at Detroit, in the county of Becker and State of Minnesota, have invented certain new and useful Improvements in Cockroach-Traps; and we do hereby declare the following to be a full, clear, and exact description of the invention, such as will enable others skilled in the art to which it appertains to make and use the same.

Our invention has for its object to provide a highly efficient cockroach trap; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a plan view of the improved trap;

Fig. 2 is a bottom plan view of the same;

Fig. 3 is a plan view of the trap with the outer cover removed;

Fig. 4 is a plan view of the trap with both covers removed;

Fig. 5 is a horizontal section taken on the irregular line 5—5 of Fig. 6;

Fig. 6 is a view in vertical section taken on the irregular line 6—6 of Fig. 5;

Fig. 7 is a view in vertical section taken through the outer cover on the line 7—7 of Fig. 6; and Fig. 8 is a detail view in vertical section taken on the line 8—8 of Fig. 5.

The improved trap comprises a box 9 having a removable outer cover 10 with a flange that caps said box. As shown, the box 9 is of rectangular form, but it is, of course, understood that the same may be made in various different forms, and is provided with an endless outwardly and downwardly projecting flange 9′, the lower edge of which terminates sufficiently above the bottom line of the box, or the support on which it rests, to permit a cockroach to pass thereunder. This flange or cover 9′ affords thereunder a dark runway 11 in which the cockroaches may collect and hide.

In the center of the outer cover 10, is a hopper 12 having at its bottom an elongated entrance opening 13 under which is located a horizontally disposed runway 14, having tubular outer ends located outward of the walls of said hopper and above the bottom of the box 9. Within the box 9, is a central collecting chamber 15 surrounded by walls 16 that are spaced apart from the walls of the box 9 to afford four long and narrow compartments, indicated by the numerals 17 to 20, inclusive, and four small substantially square compartments, indicated by the numerals 21 to 24, inclusive. The compartments 21 to 24, inclusive, are located in the corners of the box 9 between the compartments 17 to 20, inclusive. The walls 16 have a height equal to only about one-half of the height of the sides of the box 9 and removably supported thereon, is a rectangular inner cover 25 for the compartments 17 to 24, inclusive. The inner edge of the cover 25 is extended inward over the walls 16 and sloped downward to afford a baffle flange 26, which completely surrounds the collecting compartment 15 and prevents cockroaches from running over the walls 16.

In addition to the entrance passageway 14, cockroaches may enter the central collecting chamber 15 through several, as shown four, covered upwardly inclined passageways 27, the outer open ends of which lead from the runway 11 at the bottom of the box 9. The open inner ends of the passageways 27 extend through the walls 16 and inward thereof and terminate substantially in the same plane with the passageway 14. These passageways 27 extend obliquely, one through each of the compartments 17 to 20, inclusive, with sufficient clearance to permit cockroaches to pass thereunder. Said passageways have converging side walls, so that the inner ends thereof are comparatively narrow. To prevent cockroaches from going onto the baffle flange 26 from the passageways 27, the tops of said passageways are extended and curved inwardly and downwardly to afford hoods 28, as best shown in Fig. 6.

Openings 29 are formed in all of the walls 16 which separate the compartments 17 to 20, inclusive, from the compartments 21 to 24, inclusive, with the exception of the wall between the compartments 17 and 22. Two openings 30 are formed in the wall 16 between the compartments 15 and 17 and which openings are separated by a V-shaped partition 31. All of the openings 29 and 30 are located at the bottom of the box 9. A trapping passageway 32 is located in the compartment 17 and a like passageway 33 is located in the compartment 18. These passageways 32 and 33 are upwardly inclined from the bottoms of the respective compartments 17 and 18 and extend in opposite directions away from the openings 30. The passageways 32 and 33 have converging side walls and open tops and secured in their upper ends are short tubes 34, which project outward of the walls of said passageways and are located above the floor of the box and spaced apart from the side walls of the respective compartments. By reference to Figs. 4 and 5, it will be noted that the sides of the passageways 32 and 33, at their lower ends, engage the side walls of the respective compartments 17 and 18, and thereby form partitions thereacross. So as to not obstruct the tube 34 of the passageway 32, substantially all of the wall between the compartments 17 and 22 is cut away.

Cockroaches entering the passageways 27 are crowded by the converging side walls thereof into the open inner ends of said passageway, and, as they cannot turn around, they will enter the compartment 15. From the central collecting compartment 15, the cockroaches cannot escape through the passageways 14 or 27, for the reason that they are located considerably above the bottom of the box 9 and inward of the adjacent wall. Neither can they climb over the walls 16, on account of the baffle flange 26. From the collecting compartment 15, the cockroaches will find their way through the openings 30 into the compartment 17. Continuing in one direction in the compartment 17, they will find their way up the inclined passageway 32 through the upper tubular end thereof and into the compartment 22. When once in this compartment 22, they cannot return to the compartment 15 and are finally trapped, on account of said runway 32 extending completely across the compartment 17. Continuing in the other direction in the compartment 17, the cockroaches will first pass into the compartment 21 and then into the compartment 18 through the respective openings 29. From the compartment 18, they will find their way up the inclined passageway 33 and pass through the tubular upper end thereof and into the other side of the compartment 18, where they are finally trapped. Between the trapping passageways 32 and 33, the cockroaches may run back and forth through the compartments 18, 20, 23, 19 and 22, but they cannot escape.

Cockroaches going up the passageways 32 and 33, are crowded by the converging walls thereof into the tubular upper ends 34, from whence they enter either of the compartments 18 and 22. As the upper tubular ends of the passageways are located above the bottom of the box and spaced apart from the adjacent walls, cockroaches cannot again enter the same. The passageways 32 and 33 are preferably made loose, so that they may be removed, when emptying the trap. Cockroaches caught in the trap may be disposed of in any suitable manner. It is, of course, understood that a suitable bait is placed in the trap. The above described invention has, in actual usage, proven highly efficient for the purpose had in view.

What we claim is:

1. A cockroach trap including a collecting compartment, a trapping compartment, an opening between said two compartments, and a trapping partition in the trapping compartment at each side of said opening, one of said partitions being in the form of an inclined runway having its upper end located within the trapping compartment and above the bottom thereof.

2. A cockroach trap including a collecting compartment, a trapping compartment, an opening between said two compartments, and a trapping partition in the trapping compartment at each side of said opening, one of said partitions being in the form of a removable inclined runway having its upper end located within and above the bottom of the trapping compartment and spaced apart from the side walls thereof.

3. A cockroach trap including a collecting compartment, a trapping compartment, an opening between said two compartments, and a trapping partition in the trapping compartment at each side of said opening, one of said partitions being in the form of an inclined runway having a tubular upper end that extends within and above the bottom of the trapping compartment and spaced apart from the side walls thereof.

4. A cockroach trap including a box having a central collecting compartment, a trapping compartment surrounding said collecting compartment, an opening between said two compartments, and two trapping runways located on opposite sides of the opening leading from the collecting compartment to the trapping compartment and inclined in reverse directions therefrom, the outer ends of said runways being of tubular form and located within and above the bottom of the trapping compartment and spaced apart from the side walls thereof.

In testimony whereof we affix our signatures in presence of two witnesses.

CHRISTEN E. BJORGE.
EDWARD E. BJORGE.

Witnesses:
D. N. JENSON,
E. E. JENSON.